US009831477B2

United States Patent
Yu et al.

(10) Patent No.: US 9,831,477 B2
(45) Date of Patent: Nov. 28, 2017

(54) ELECTRONIC DEVICE AND BATTERY ACCOMMODATING MODULE

(71) Applicant: Wistron Corporation, New Taipei (TW)

(72) Inventors: Zhi-Tao Yu, New Taipei (TW); Chong-Xing Zhu, New Taipei (TW); Chia-Hsin Liu, New Taipei (TW)

(73) Assignee: Wistron Corporation, New Taipei (TW)

( * ) Notice: Subject to any disclaimer, the term of this patent is extended or adjusted under 35 U.S.C. 154(b) by 196 days.

(21) Appl. No.: 14/790,001

(22) Filed: Jul. 2, 2015

(65) Prior Publication Data

US 2016/0226037 A1 Aug. 4, 2016

(30) Foreign Application Priority Data

Feb. 4, 2015 (CN) .......................... 2015 1 0059506

(51) Int. Cl.
*H01M 2/22* (2006.01)
*H01M 2/10* (2006.01)

(52) U.S. Cl.
CPC ...... *H01M 2/1022* (2013.01); *H01M 2220/30* (2013.01)

(58) Field of Classification Search
CPC ........... H01M 2/1022; H01M 2220/30; H01M 2/0217; H01M 2/10; H01M 2/22; H01M 2/1016; H01M 2/1061; H01M 2/1083
See application file for complete search history.

(56) References Cited

U.S. PATENT DOCUMENTS 5,413,499 A * 5/1995 Wright, Jr. .......... H01M 2/1066
429/1
2010/0253519 A1* 10/2010 Brackmann ............... B60P 3/03
340/572.1

FOREIGN PATENT DOCUMENTS

| TW | 380757 | 1/2000 |
| TW | M350782 | 2/2009 |
| TW | 201106136 | 2/2011 |
| TW | I425339 B | 2/2014 |

(Continued)

OTHER PUBLICATIONS

Office action dated Jan. 12, 2016 for the Taiwan application No. 104107060, filing date: Mar. 5, 2015, p. 1 line 14, p. 2~6 and p. 7 line 1~7.

*Primary Examiner* — Mark F Huff
*Assistant Examiner* — Monique Wills
(74) *Attorney, Agent, or Firm* — Winston Hsu

(57) ABSTRACT

A battery accommodating module is used for accommodating a battery. The battery accommodating module includes a battery case and a latch member. The battery case has an accommodating space and a side of the battery case has two pivot holes and at least one first restraining portion. The latch member has two pivot portions and at least one second restraining portion, wherein the pivot portions are pivotally connected to the pivot holes, such that the latch member can rotate with respect to the battery case between a lock position and an unlock position. When the latch member is located at the unlock position, the first restraining portion keeps the second restraining portion at a first side of the first restraining portion. When the latch member is located at the lock position, the first restraining portion keeps the second restraining portion at a second side of the first restraining portion.

10 Claims, 11 Drawing Sheets

(56) References Cited

FOREIGN PATENT DOCUMENTS

| TW | I427460 B | 2/2014 |
|---|---|---|
| TW | M478182 U | 5/2014 |

* cited by examiner

US 9,831,477 B2

ELECTRONIC DEVICE AND BATTERY ACCOMMODATING MODULE

BACKGROUND OF THE INVENTION

1. Field of the Invention

The invention relates to an electronic device and a battery accommodating module and, more particularly, to a battery accommodating module allowing a battery and/or a battery case to be attached or detached rapidly and an electronic device equipped with the battery accommodating module.

2. Description of the Prior Art

So far some electronic devices (e.g. server) are equipped with a battery case for accommodating a battery, such that the battery can supply power to electronic components of the electronic device while a power failure occurs, so as to maintain normal operation. In general, there are various electronic components installed in a casing of the electronic device and the electronic components occupy much space of the casing. Accordingly, how to attach or detach the battery rapidly without any tools in a limited space becomes a significant design issue. Furthermore, the prior art usually uses screws to fix the battery case in the casing of the electronic device. It is inconvenient to fix the battery case by screws and the battery case cannot be attached or detached if there is no suitable screw driver. Accordingly, how to attach or detach the battery case rapidly without any tools becomes another significant design issue.

SUMMARY OF THE INVENTION

The invention provides a battery accommodating module allowing a battery and/or a battery case to be attached or detached rapidly and an electronic device equipped with the battery accommodating module, so as to solve the aforesaid problems.

According to the claimed invention, a battery accommodating module for accommodating a battery comprises a battery case and a latch member. The battery case has an accommodating space and a side of the battery case has two pivot holes and at least one first restraining portion. The latch member has two pivot portions and at least one second restraining portion, wherein the pivot portions are pivotally connected to the pivot holes, such that the latch member is capable of rotating with respect to the battery case between a lock position and an unlock position. When the latch member is located at the unlock position, the first restraining portion keeps the second restraining portion at a first side of the first restraining portion and a bottom of the latch member is raised with respect to a bottom of the battery case. When the latch member is located at the lock position, the first restraining portion keeps the second restraining portion at a second side of the first restraining portion, such that the battery is fixed in the accommodating space by the latch member.

According to the claimed invention, when the battery is placed into the accommodating space and presses the bottom of the latch member down, the latch member rotates from the unlock position to the lock position and the second restraining portion moves from the first side of the first restraining portion to the second side of the first restraining portion; when the latch member is operated to rotate from the lock position to the unlock position, the second restraining portion moves from the second side of the first restraining portion to the first side of the first restraining portion and the bottom of the latch member is raised with respect to the bottom of the battery case, so as to lift the battery up from the accommodating space.

According to the claimed invention, the battery case has a crisscross switch, the crisscross switch has a press portion, an engaging portion and two connecting portions, the press portion and the engaging portion are located at opposite sides of the two connecting portions, and the two connecting portions are connected to the bottom of the battery case; when the battery case is disposed on a casing, the engaging portion is engaged with a protruding portion of the casing; when the press portion is pressed, the two connecting portions deform elastically, such that the engaging portion is raised with respect to the bottom of the battery case and then disengaged from the protruding portion.

According to the claimed invention, the battery case has a plurality of first positioning portions and the casing has a plurality of second positioning portions; when the battery case is disposed on the casing, the first positioning portions are engaged with the second positioning portions.

According to the claimed invention, at least one of the first positioning portions has a positioning rib and at least one of the second positioning portions has a positioning groove; when the first positioning portions are engaged with the second positioning portions, the positioning rib is located in the positioning groove.

According to the claimed invention, at least one of the first positioning portions has a protrusion; when the first positioning portions are engaged with the second positioning portions, the protrusion abuts against the second positioning portion correspondingly.

According to the claimed invention, the latch member has a support portion; when the latch member is located at the unlock position, the support portion abuts against a side wall of the battery case, such that the bottom of the latch member is raised with respect to the bottom of the battery case by a fixed angle.

According to the claimed invention, the battery has two arc-shaped edges, the battery case has a first arc-shaped clamping portion, and the latch member has a second arc-shaped clamping portion; when the battery is accommodated in the accommodating space, the first arc-shaped clamping portion and the second arc-shaped clamping portion clamp the two arc-shaped edges, respectively.

According to the claimed invention, the first arc-shaped clamping portion has a protruding block; when the battery is accommodated in the accommodating space, an interference fit is formed between the protruding block and one of the two arc-shaped edges.

According to the claimed invention, opposite sides of the battery case have a plurality of restraining ribs; when the battery is accommodated in the accommodating space, the restraining ribs abut against opposite sides of the battery.

According to the claimed invention, an electronic device comprises a casing and a battery accommodating module. The battery accommodating module is disposed on the casing and used for accommodating a battery. The battery accommodating module comprises a battery case and a latch member. The battery case has an accommodating space and a side of the battery case having two pivot holes and at least one first restraining portion. The latch member has two pivot portions and at least one second restraining portion, wherein the two pivot portions are pivotally connected to the pivot holes, such that the latch member is capable of rotating with respect to the battery case between a lock position and an unlock position. When the latch member is located at the unlock position, the first restraining portion keeps the second restraining portion at a first side of the first restraining portion and a bottom of the latch member is raised with respect to a bottom of the battery case. When the latch member is located at the lock position, the first restraining portion keeps the second restraining portion at a second side of the first restraining portion, such that the battery is fixed in the accommodating space by the latch member.

According to the claimed invention, when the battery is placed into the accommodating space and presses the bottom of the latch member down, the latch member rotates from the unlock position to the lock position and the second restraining portion moves from the first side of the first restraining portion to the second side of the first restraining portion; when the latch member is operated to rotate from the lock position to the unlock position, the second restraining portion moves from the second side of the first restraining portion to the first side of the first restraining portion and the bottom of the latch member is raised with respect to the bottom of the battery case, so as to lift the battery up from the accommodating space.

According to the claimed invention, the battery case has a crisscross switch, the crisscross switch has a press portion, an engaging portion and two connecting portions, the press portion and the engaging portion are located at opposite sides of the two connecting portions, and the connecting portions are connected to the bottom of the battery case; when the battery case is disposed on the casing, the engaging portion is engaged with a protruding portion of the casing; when the press portion is pressed, the two connecting portions deform elastically, such that the engaging portion is raised with respect to the bottom of the battery case and then disengaged from the protruding portion.

According to the claimed invention, the battery case has a plurality of first positioning portions and the casing has a plurality of second positioning portions; when the battery case is disposed on the casing, the first positioning portions are engaged with the second positioning portions.

According to the claimed invention, at least one of the first positioning portions has a positioning rib and at least one of the second positioning portions has a positioning groove; when the first positioning portions are engaged with the second positioning portions, the positioning rib is located in the positioning groove.

According to the claimed invention, at least one of the first positioning portions has a protrusion; when the first positioning portions are engaged with the second positioning portions, the protrusion abuts against the second positioning portion correspondingly.

According to the claimed invention, the latch member has a support portion; when the latch member is located at the unlock position, the support portion abuts against a side wall of the battery case, such that the bottom of the latch member is raised with respect to the bottom of the battery case by a fixed angle.

According to the claimed invention, the battery has two arc-shaped edges, the battery case has a first arc-shaped clamping portion, and the latch member has a second arc-shaped clamping portion; when the battery is accommodated in the accommodating space, the first arc-shaped clamping portion and the second arc-shaped clamping portion clamp the two arc-shaped edges, respectively.

According to the claimed invention, the first arc-shaped clamping portion has a protruding block; when the battery is accommodated in the accommodating space, an interference fit is formed between the protruding block and one of the two arc-shaped edges.

According to the claimed invention, opposite sides of the battery case have a plurality of restraining ribs; when the battery is accommodated in the accommodating space, the restraining ribs abut against opposite sides of the battery.

As mentioned in the above, when the latch member is located at the unlock position, a user can place the battery into the accommodating space of the battery case and press the battery down. Then, the latch member rotates from the unlock position to the lock position, such that the battery is fixed in the accommodating space by the latch member. When the user wants to detach the battery from the battery case, the user needs to operate the latch member to rotate with respect to the battery case. Then, the latch member rotates from the lock position to the unlock position, such that the bottom of the latch member is raised with respect to the bottom of the battery case, so as to lift the battery up from the accommodating space. Accordingly, the user can attach/detach the battery to/from the battery case rapidly without any tools.

Furthermore, the user can engage the engaging portion, the positioning portion and the positioning rib of the crisscross switch of the battery case with the protruding portion, the positioning portion and positioning groove of the casing of the electronic device, respectively, so as to fix the battery case on the casing of the electronic device. Moreover, the user can press the press portion of the crisscross switch to detach the battery case from the casing of the electronic device. Accordingly, the user can attach/detach the battery case to/from the casing of the electronic device rapidly without any tools.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
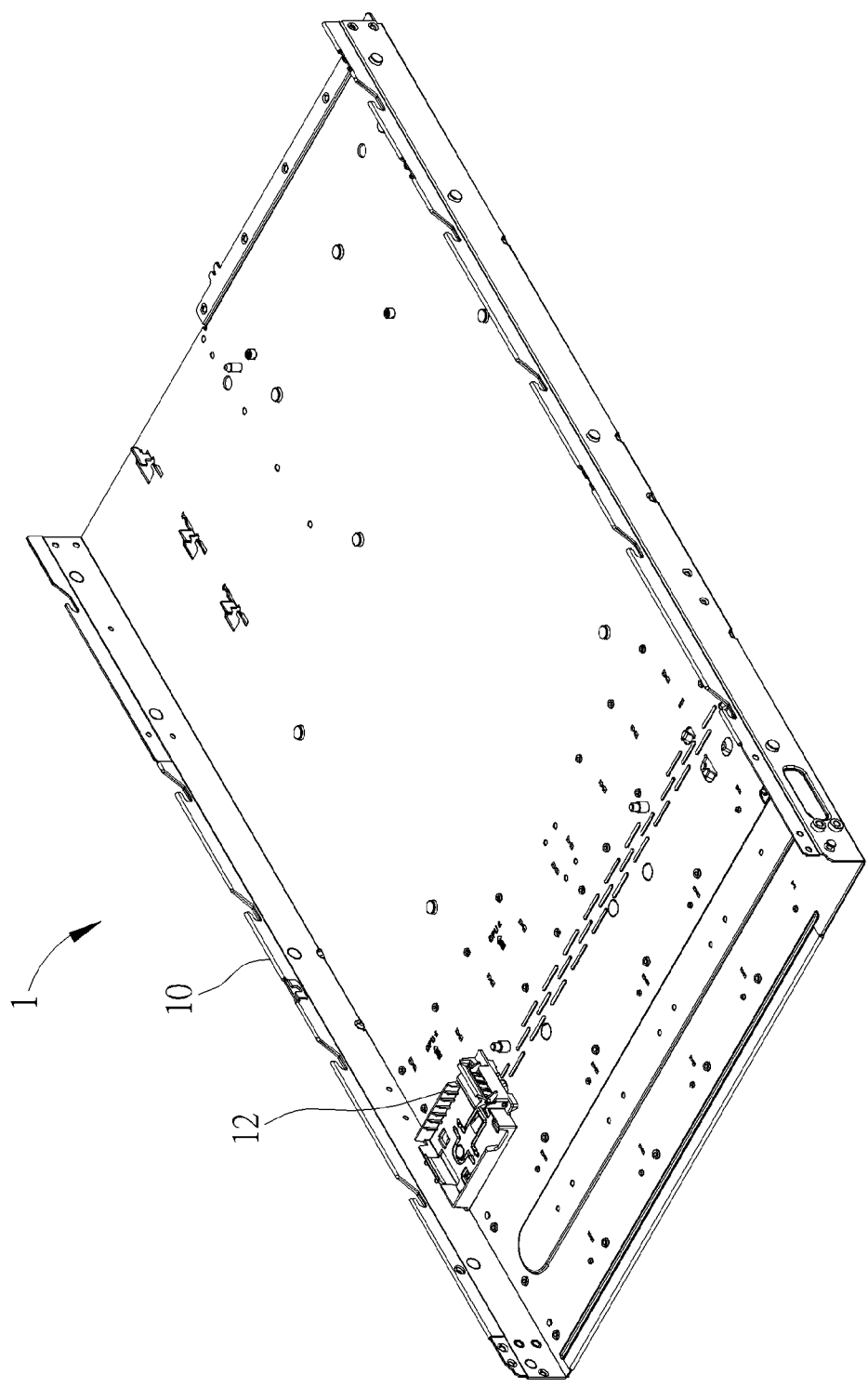
FIG. 1 is a perspective view illustrating parts of an electronic device according to an embodiment of the invention.
Figure 2:
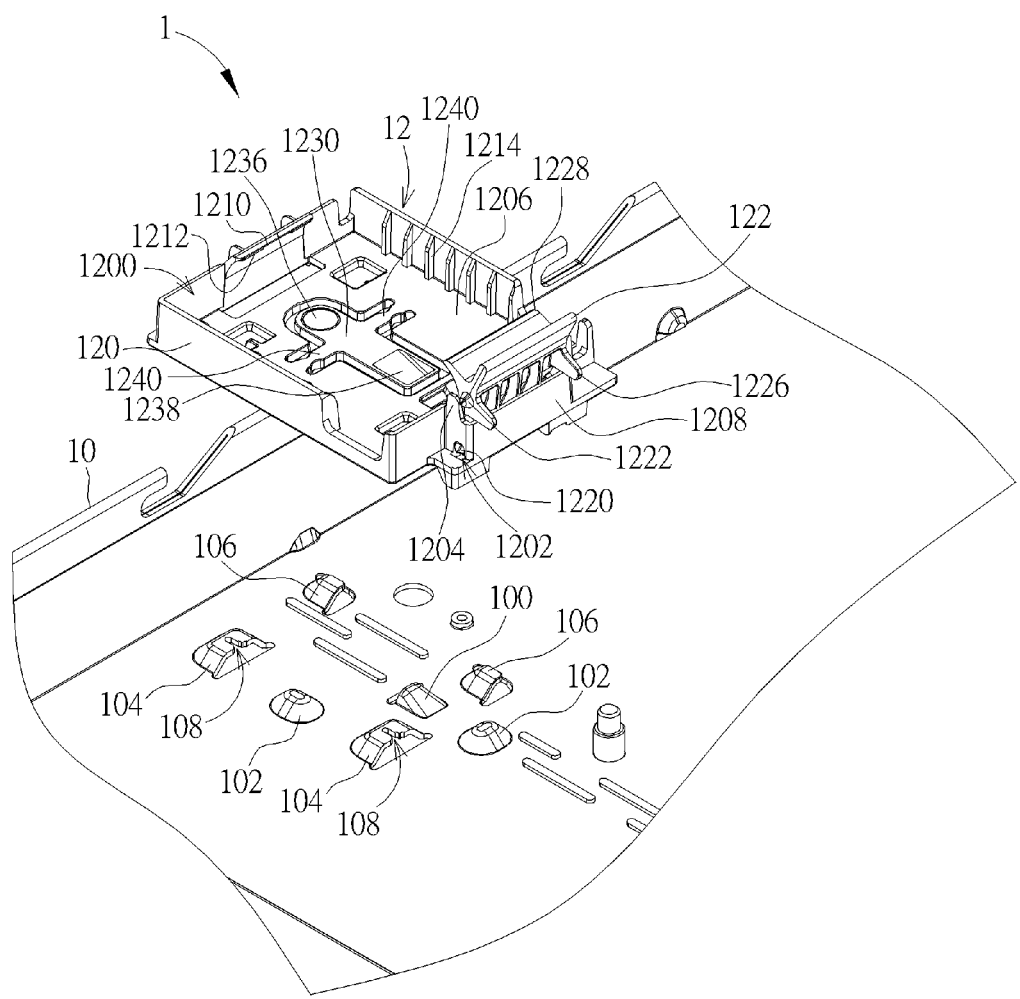
FIG. 2 is an exploded view illustrating the electronic device shown in FIG. 1.
Figure 3:
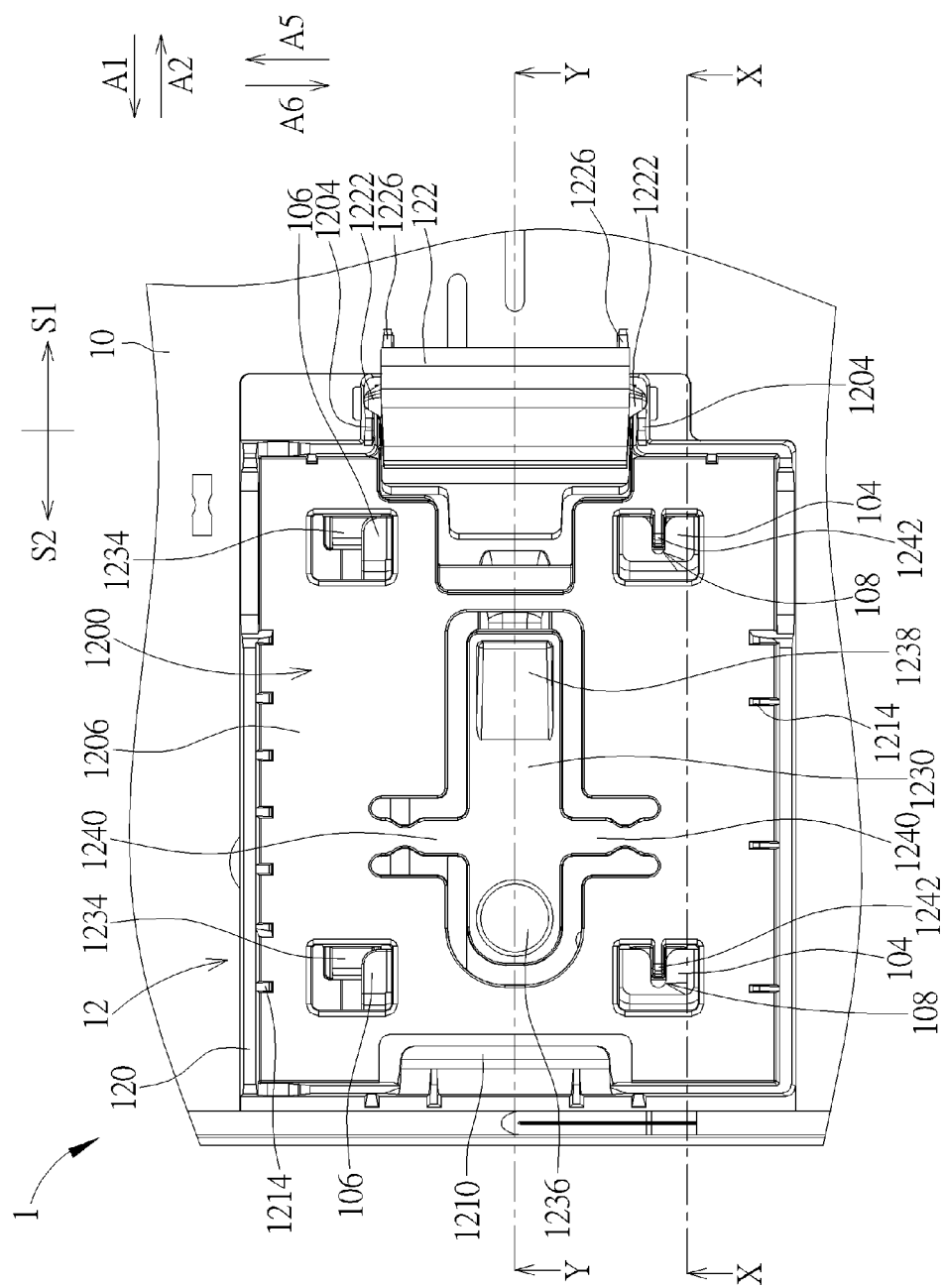
FIG. 3 is a top view illustrating the electronic device shown in FIG. 1.
Figure 4:
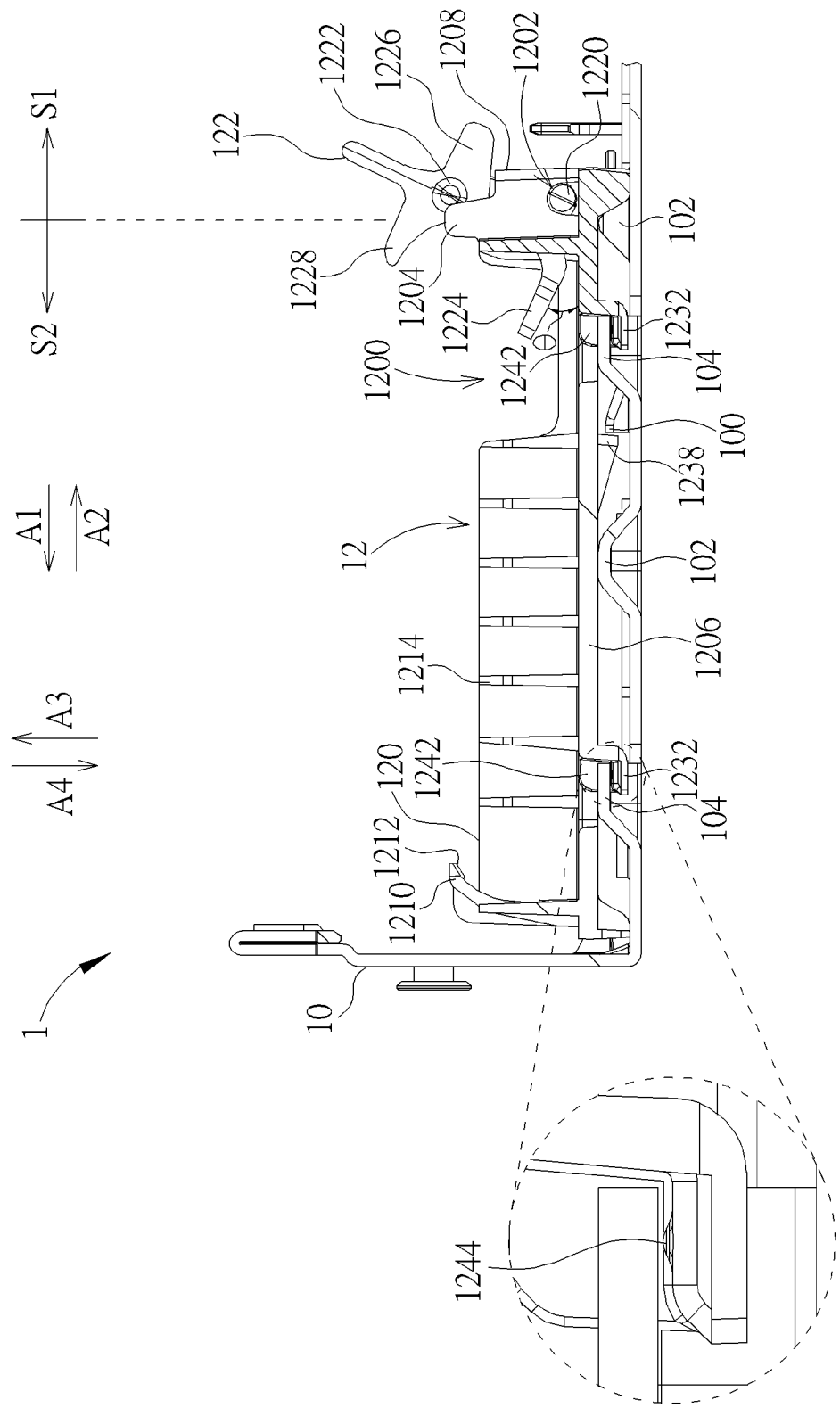
FIG. 4 is a cross-sectional view illustrating the electronic device shown in FIG. 3 along line X-X.
Figure 5:
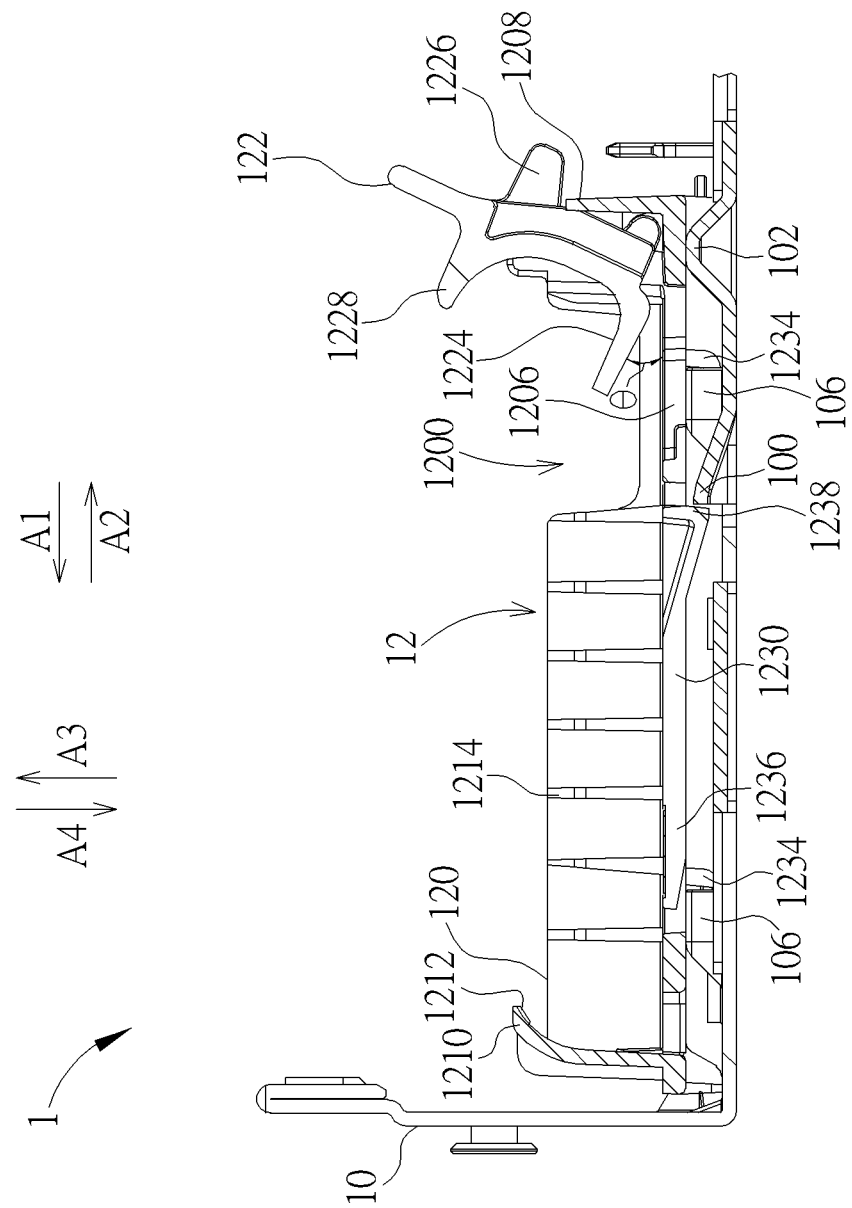
FIG. 5 is a cross-sectional view illustrating the electronic device shown in FIG. 3 along line Y-Y.
Figure 6:
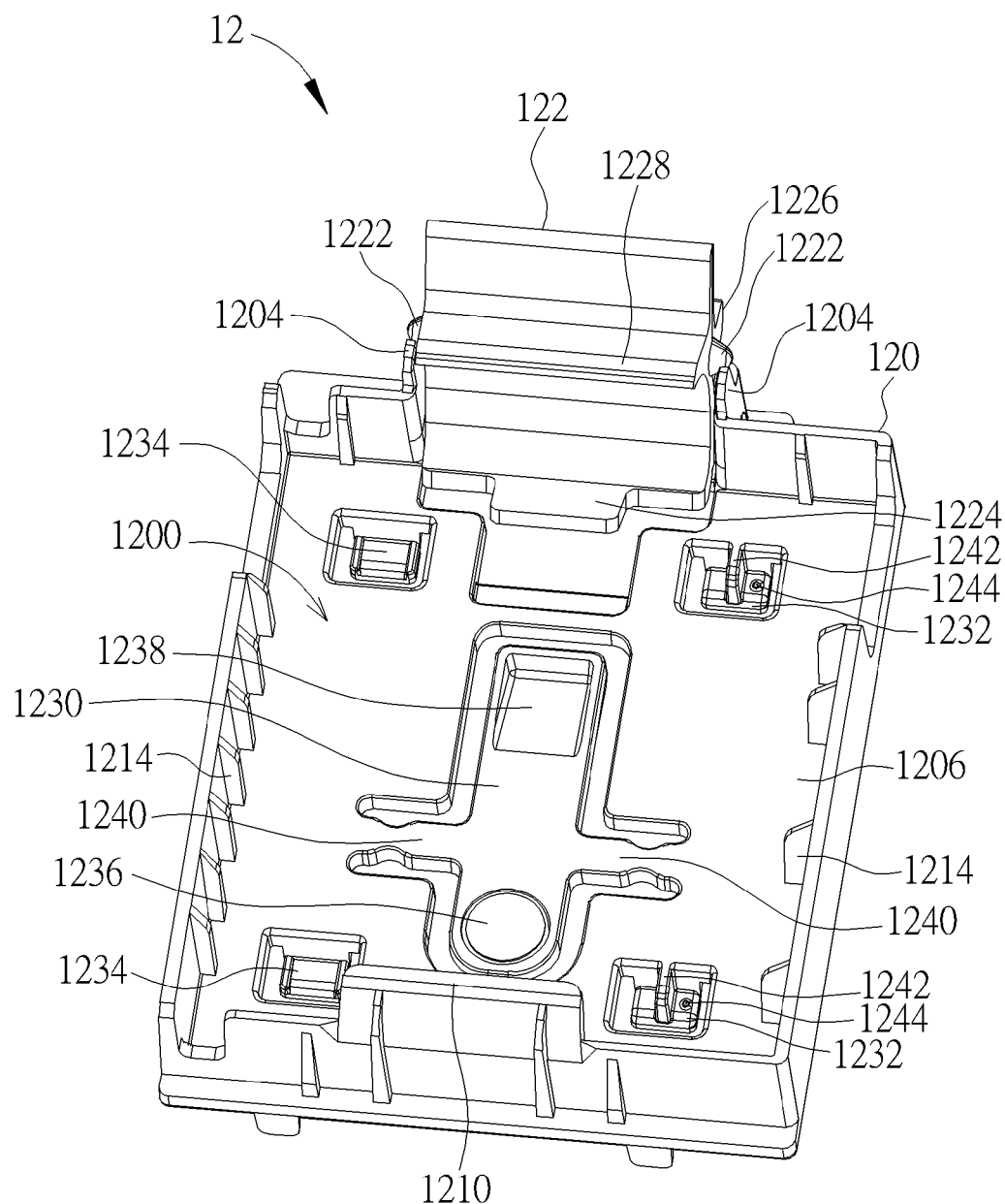
FIG. 6 is a perspective view illustrating the battery accommodating module shown in FIG. 1 from another viewing angle.
Figure 7:
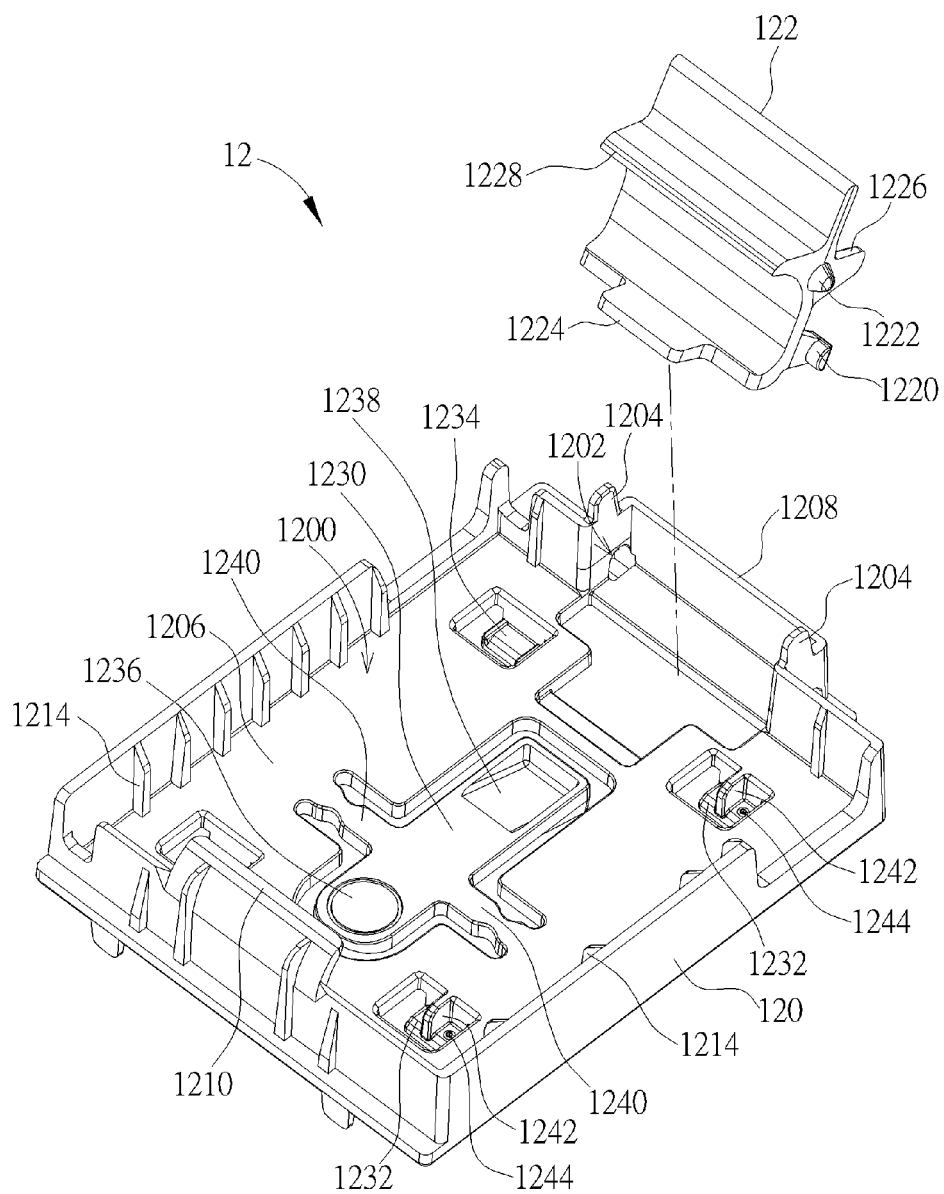
FIG. 7 is an exploded view illustrating the battery accommodating module shown in FIG. 6.
Figure 8:
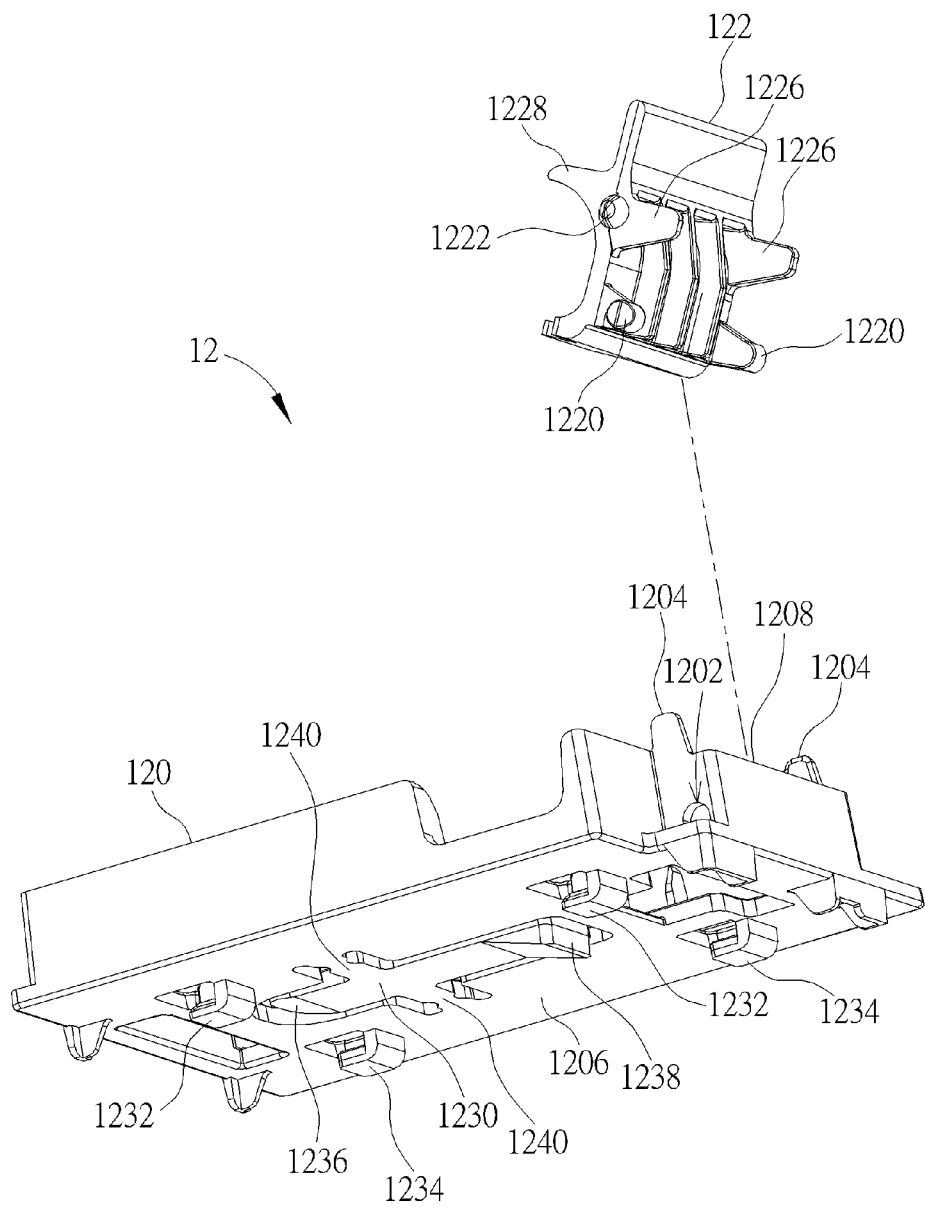
FIG. 8 is an exploded view illustrating the battery accommodating module shown in FIG. 6 from another viewing angle.
Figure 9:
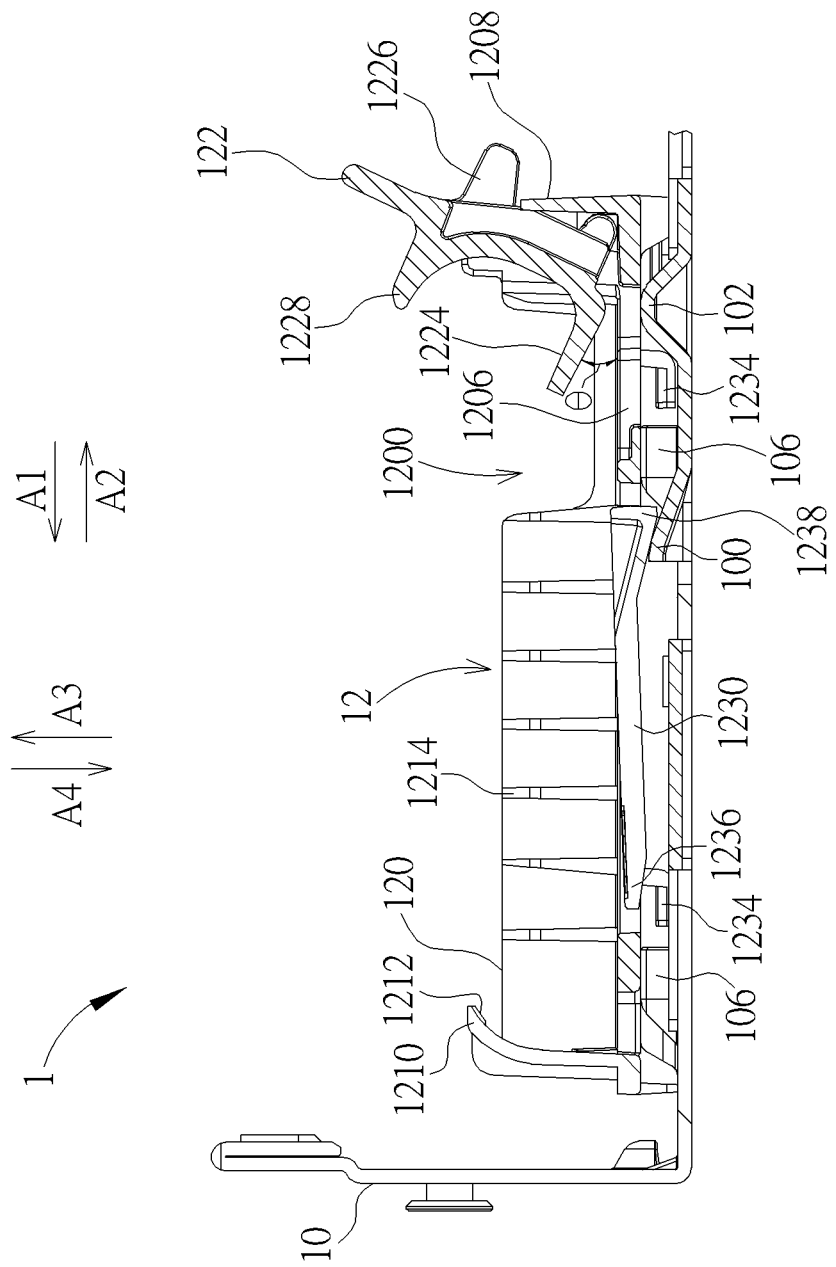
FIG. 9 is a schematic view illustrating a process of attaching/detaching the battery accommodating module to/from the casing shown in FIG. 4.
Figure 10:
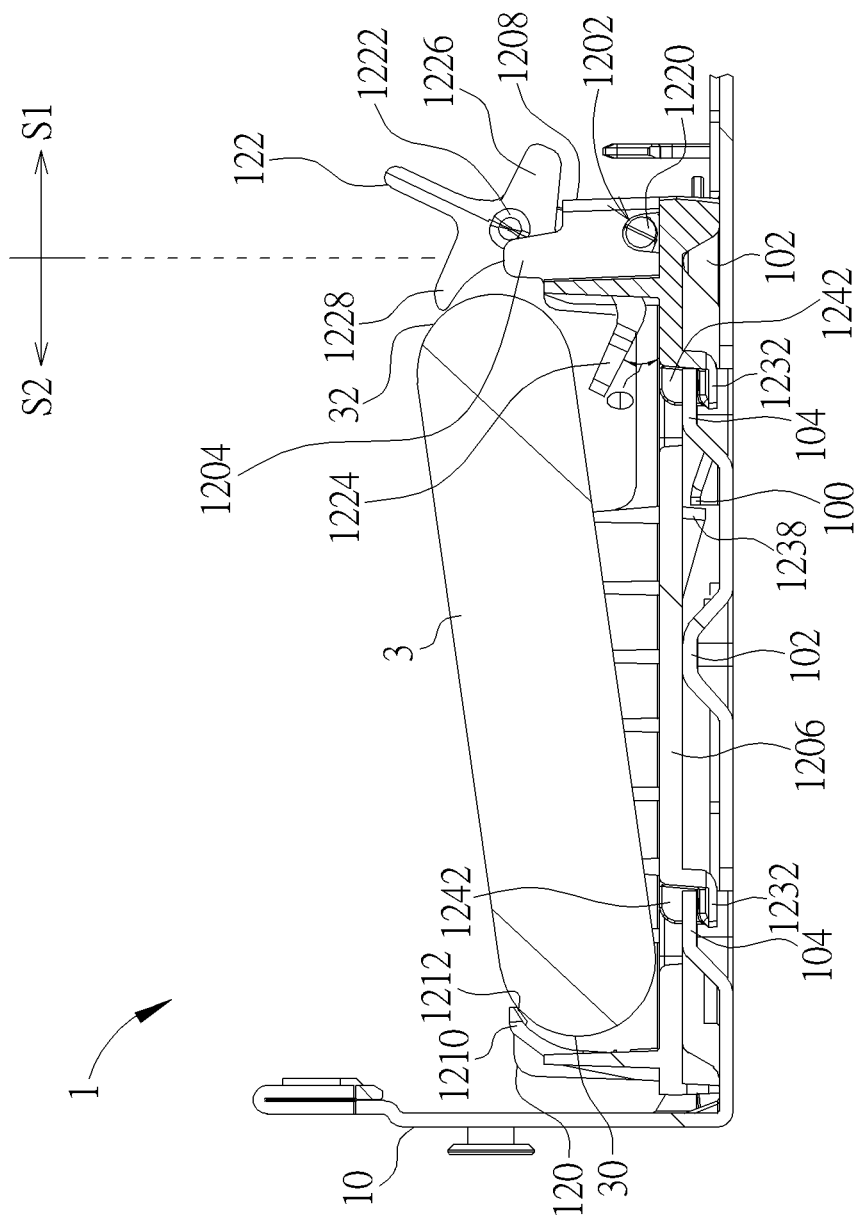
FIG. 10 is a schematic view illustrating the battery placed into the accommodating space of the battery accommodating module shown in FIG. 4.
Figure 11:
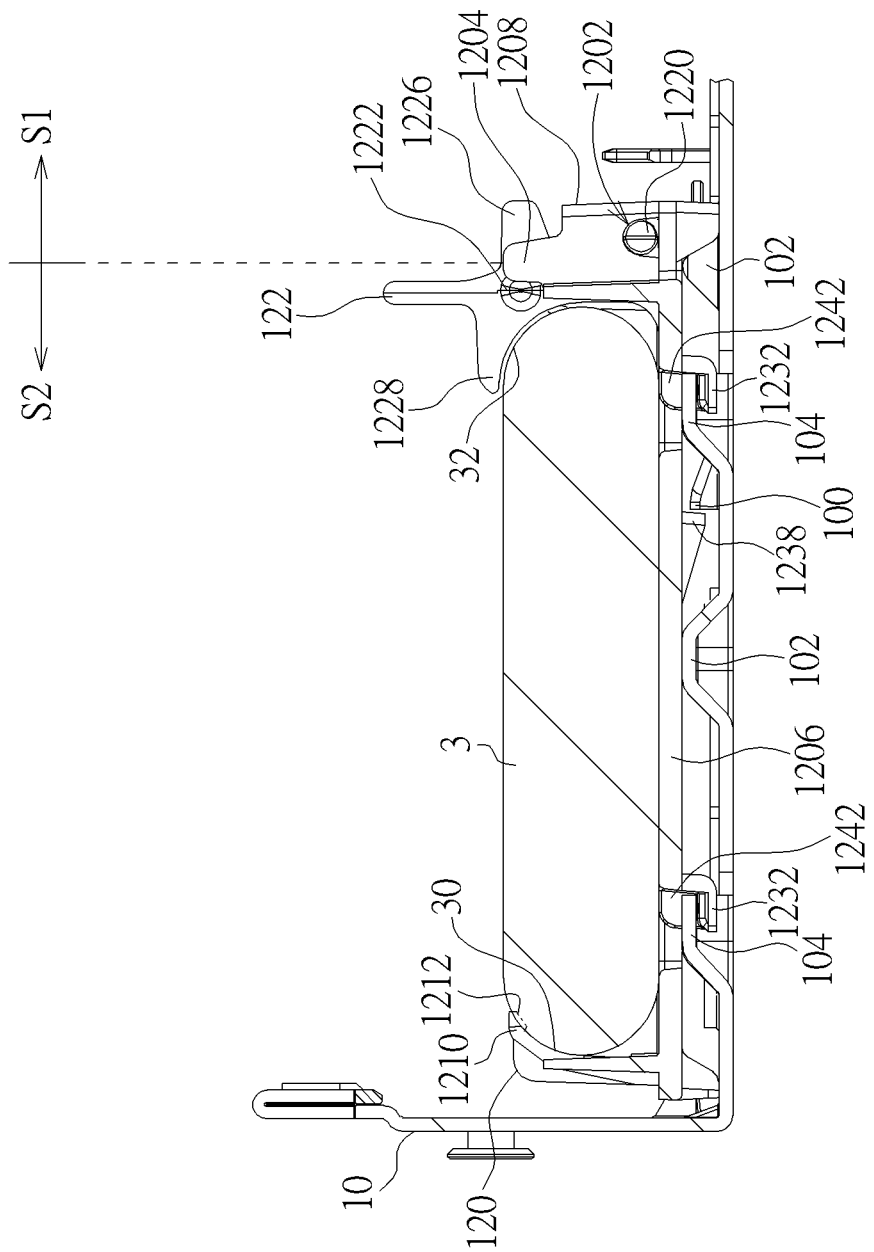
FIG. 11 is a schematic view illustrating the battery fixed in the accommodating space of the battery accommodating module shown in FIG. 10.

Referring to FIGS. 1 to 11, FIG. 1 is a perspective view illustrating parts of an electronic device 1 according to an embodiment of the invention, FIG. 2 is an exploded view illustrating the electronic device 1 shown in FIG. 1, FIG. 3 is a top view illustrating the electronic device 1 shown in FIG. 1, FIG. 4 is a cross-sectional view illustrating the electronic device 1 shown in FIG. 3 along line X-X, FIG. 5 is a cross-sectional view illustrating the electronic device 1 shown in FIG. 3 along line Y-Y, FIG. 6 is a perspective view illustrating the battery accommodating module 12 shown in FIG. 1 from another viewing angle, FIG. 7 is an exploded view illustrating the battery accommodating module 12 shown in FIG. 6, FIG. 8 is an exploded view illustrating the battery accommodating module 12 shown in FIG. 6 from another viewing angle, FIG. 9 is a schematic view illustrating a process of attaching/detaching the battery accommodating module 12 to/from the casing 10 shown in FIG. 4, FIG. 10 is a schematic view illustrating the battery 3 placed into the accommodating space 1200 of the battery accommodating module 12 shown in FIG. 4, and FIG. 11 is a schematic view illustrating the battery 3 fixed in the accommodating space 1200 of the battery accommodating module 12 shown in FIG. 10.

As shown in FIG. 1, the electronic device 1 of the invention comprises a casing 10 and a battery accommodating module 12, wherein the battery accommodating module 12 is disposed on the casing 10 and used for accommodating a battery 3 (as shown in FIG. 11). It should be noted that the casing 10 shown in FIG. 1 is only apart of a complete casing of the electronic device 1. In practical applications, the electronic device 1 may be a server or other electronic devices, which need to use a battery to supply power.

As shown in FIGS. 2 and 3, the battery accommodating module 12 comprises a battery case 120 and a latch member 122. The battery case 120 has an accommodating space 1200 and a side of the battery case 120 has two pivot holes 1202 and at least one first restraining portion 1204. The latch member 122 has two pivot portions 1220 and at least one second restraining portion 1222. The pivot portions 1220 of the latch member 122 can be pivotally connected to the pivot holes 1202 of the battery case 120, such that the latch member 122 is capable of rotating with respect to the battery case 120 between a lock position (as shown in FIG. 11) and an unlock position (as shown in FIG. 10). In this embodiment, the battery case 120 has, but not limited to, two opposite first restraining portions 1204 and the latch member 122 has, but not limited to, two opposite second restraining portions 1222.

As shown in FIG. 10, when the latch member 122 is located at the unlock position, the first restraining portion 1204 of the battery case 120 keeps the second restraining portion 1222 of the latch member 122 at a first side S1 of the first restraining portion 1204 and a bottom 1224 of the latch member 122 is raised with respect to a bottom 1206 of the battery case 120. In this embodiment, the latch member 122 may has a support portion 1226. When the latch member 122 is located at the unlock position, the support portion 1226 abuts against a side wall 1208 of the battery case 120, such that the bottom 1224 of the latch member 122 is raised with respect to the bottom 1206 of the battery case 120 by a fixed angle θ. Furthermore, the battery 3 has two arc-shaped edges 30, 32, the battery case 120 has a first arc-shaped clamping portion 1210, and the latch member 122 has a second arc-shaped clamping portion 1228, wherein the first arc-shaped clamping portion 1210 has a protruding block 1212.

When a user wants to attach the battery 3 to the battery accommodating module 12, the user can operate the latch member 122 to rotate with respect to the battery case 120 to the unlock position shown in FIG. 10. Afterward, the user can place the arc-shaped edge 30 of the battery 3 into the accommodating space 1200 of the battery case 120 toward the first arc-shaped clamping portion 1210 of the battery case 120. At this time, the other arc-shaped edge 32 of the battery 3 leans against the bottom 1224 of the latch member 122. Then, the user needs to press the battery 3 to press the bottom 1224 of the latch member 122 down, such that the latch member 122 rotates from the unlock position shown in FIG. 10 to the lock position shown in FIG. 11. In other words, when the battery 3 is placed into the accommodating space 1200 of the battery case 120 and presses the bottom 1224 of the latch member 122 down, the latch member 122 rotates from the unlock position to the lock position. At this time, the second restraining portion 1222 of the latch member 122 moves from the first side S1 of the first restraining portion 1204 of the battery case 120 to a second side S2 of the first restraining portion 1204.

As shown in FIG. 11, when the latch member 122 is located at the lock position, the first restraining portion 1204 of the battery case 120 keeps the second restraining portion 1222 of the latch member 122 at the second side S2 of the first restraining portion 1204, such that the battery 3 is fixed in the accommodating space 1200 of the battery case 120 by the latch member 122. When the battery 3 is accommodated in the accommodating space 1200, the first arc-shaped clamping portion 1210 of the battery case 120 and the second arc-shaped clamping portion 1228 of the latch member 122 clamp the two arc-shaped edges 30, 32 of the battery 3, respectively, so as to prevent the battery from coming off the accommodating space 1200 of the battery case 120. Furthermore, when the battery 3 is accommodated in the accommodating space 1200 of the battery case 120, an interference fit is formed between the protruding block 1212 of the first arc-shaped clamping portion 1210 and the arc-shaped edge 30 of the battery 3, such that the battery 3 can be fixed in the accommodating space 1200 of the battery case 120 more stably. Still further, opposite sides of the battery case 120 may have a plurality of restraining ribs 1214. When the battery 3 is accommodated in the accommodating space 1200 of the battery case 120, the restraining ribs 1214 (as shown in FIG. 7) abut against opposite sides of the battery 3, such that the battery 3 can be fixed in the accommodating space 1200 of the battery case 120 more stably.

When the user wants to detach the battery 3 from the battery accommodating module 12, the user needs to operate the latch member 122 to rotate with respect to the battery case 120 to the unlock position shown in FIG. 10. When the latch member 122 is operated to rotate from the lock position shown in FIG. 11 to the unlock position shown in FIG. 10, the second restraining portion 1222 of the latch member 122 moves from the second side S2 of the first restraining portion 1204 of the battery case 120 to the first side S1 of the first restraining portion 1204 and the bottom 1224 of the latch member 122 is raised with respect to the bottom 1206 of the battery case 120, so as to lift the battery 3 up from the accommodating space 1200 of the battery case 120. At this time, the user can take the battery 3 out from the battery case 120 easily.

As shown in FIGS. 2 to 9, the battery case 120 further has a crisscross switch 1230 and a plurality of first positioning portions 1232, 1234 (as shown in FIG. 6). The crisscross switch 1230 has a press portion 1236, an engaging portion 1238 and two connecting portions 1240, wherein the press portion 1236 and the engaging portion 1238 are located at opposite sides of the connecting portions 1240, and the two connecting portions 1240 are connected to the bottom 1206 of the battery case 120. Furthermore, the first positioning portion 1232 has a positioning rib 1242 and a protrusion 1244. The casing 10 has a plurality of protruding portions 100, 102 and a plurality of second positioning portions 104, 106 (as shown in FIGS. 4 and 5). Moreover, the second positioning portion 104 has a positioning groove 108 (as shown in FIG. 3).

As shown in FIG. 9, the user can attach the battery case 120 of the battery accommodating module 12 to the casing 10 in the direction indicated by the arrow A1. Before the battery case 120 is attached to the casing 10 completely, the engaging portion 1238 of the crisscross switch 1230 will be pushed by the protruding portion 100 of the casing 10 in the direction indicated by the arrow A3. At this time, the connecting portions 1240 of the crisscross switch 1230 deforms elastically, such that the crisscross switch 1230 twists. After the user pushes the battery case 120 of the battery accommodating module 12 to the end in the direction indicated by the arrow A1, the two connecting portions 1240 of the crisscross switch 1230 generates elastic force, such that the engaging portion 1238 of the crisscross switch 1230 returns to the original position in the direction indicated by the arrow A4, so as to be engaged with the protruding portion 100 of the casing 10, as shown in FIG. 5. In other words, when the battery case 120 is disposed on the casing 10, the engaging portion 1238 of the crisscross switch 1230 is engaged with the protruding portion 100 of the casing 10, so as to restrain the battery case 120 from moving in the direction indicated by the arrow A2.

In addition, as shown in FIGS. 3 and 4, when the battery case 120 is disposed on the casing 10, the first positioning portions 1232, 1234 of the battery case 120 are engaged with the second positioning portions 104, 106 of the casing 10, respectively, so as to restrain the battery case 120 from moving in the directions indicated by the arrows A1, A3. When the first positioning portion 1232 of the battery case 120 is engaged with the second positioning portion 104 of the casing 10, the positioning rib 1242 of the first positioning portion 1232 is located in the positioning groove 108 of the second positioning portion 104, so as to restrain the battery case 120 from moving in the directions indicated by the arrows A5, A6. Furthermore, when the first positioning portion 1232 of the battery case 120 is engaged with the second positioning portion 104 of the casing 10, the protrusion 1244 of the first positioning portion 1232 abuts against the second positioning portion 104 correspondingly, so as to reduce the contact area between the first positioning portion 1232 and the second positioning portion 104. Moreover, when the battery case 120 is disposed on the casing 10, the bottom 1206 of the battery case 120 abuts against the protruding portion 102 of the casing 10, so as to enhance stability for the battery case 120 disposed on the casing 10.

When the user wants to detach the battery accommodating module 12 from the casing 10, the user can press the press portion 1236 of the crisscross switch 1230 in the direction indicated by the arrow A4, as shown in FIG. 9. When the press portion 1236 of the crisscross switch 1230 is pressed, the connecting portions 1240 of the crisscross switch 1230 deform elastically, such that the engaging portion 1238 of the crisscross switch 1230 is raised with respect to the bottom 1206 of the battery case 120 in the direction indicated by the arrow A3 and disengaged from the protruding portion 100 of the casing 10. Afterward, the user can push the battery case 120 in the direction indicated by the arrow A2 to detach the battery accommodating module 12 from the casing 10. Since the protrusion 1244 of the first positioning portion 1232 abuts against the second positioning portion 104 in a point contact manner, the friction will be reduced effectively while the battery case 120 is moving with respect to the casing 10. Consequently, the user can detach the battery case 120 from the casing 10 more easily.

As mentioned in the above, when the latch member is located at the unlock position, a user can place the battery into the accommodating space of the battery case and press the battery down. Then, the latch member rotates from the unlock position to the lock position, such that the battery is fixed in the accommodating space by the latch member. When the user wants to detach the battery from the battery case, the user needs to operate the latch member to rotate with respect to the battery case. Then, the latch member rotates from the lock position to the unlock position, such that the bottom of the latch member is raised with respect to the bottom of the battery case, so as to lift the battery up from the accommodating space. Accordingly, the user can attach/detach the battery to/from the battery case rapidly without any tools.

Furthermore, the user can engage the engaging portion, the positioning portion and the positioning rib of the crisscross switch of the battery case with the protruding portion, the positioning portion and positioning groove of the casing of the electronic device, respectively, so as to fix the battery case on the casing of the electronic device. Moreover, the user can press the press portion of the crisscross switch to detach the battery case from the casing of the electronic device. Accordingly, the user can attach/detach the battery case to/from the casing of the electronic device rapidly without any tools.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A battery accommodating module for accommodating a battery comprising:
   a battery case having an accommodating space, a side of the battery case having two pivot holes and at least one first restraining portion; and
   a latch member having two pivot portions and at least one second restraining portion, the two pivot portions being pivotally connected to the two pivot holes, such that the latch member is configured to rotate with respect to the battery case between a lock position and an unlock position;
   wherein when the latch member is located at the unlock position, the first restraining portion is configured to keep the second restraining portion at a first side of the first restraining portion and a bottom of the latch member is raised with respect to a bottom of the battery case; when the latch member is located at the lock position, the first restraining portion is configured to keep the second restraining portion at a second side of the first restraining portion, such that the battery is fixed in the accommodating space by the latch member.

2. The battery accommodating module of claim 1, wherein when the battery is placed into the accommodating space and presses the bottom of the latch member down, the latch member rotates from the unlock position to the lock position and the second restraining portion moves from the first side of the first restraining portion to the second side of the first restraining portion; when the latch member is operated to rotate from the lock position to the unlock position, the second restraining portion moves from the second side of the first restraining portion to the first side of the first restraining portion and the bottom of the latch member is raised with respect to the bottom of the battery case, so as to lift the battery up from the accommodating space.

3. The battery accommodating module of claim 1, wherein the battery case has a crisscross switch, the crisscross switch has a press portion, an engaging portion and two connecting portions, the press portion and the engaging portion are located at opposite sides of the two connecting portions, and the two connecting portions are connected to the bottom of the battery case; when the battery case is disposed on a casing, the engaging portion is engaged with a protruding portion of the casing; when the press portion is pressed, the two connecting portions deform elastically, such that the engaging portion is raised with respect to the bottom of the battery case and then disengaged from the protruding portion.

4. The battery accommodating module of claim 3, wherein the battery case has a plurality of first positioning portions and the casing has a plurality of second positioning portions; when the battery case is disposed on the casing, the first positioning portions are engaged with the second positioning portions.

5. The battery accommodating module of claim 4, wherein at least one of the first positioning portions has a positioning rib and at least one of the second positioning portions has a positioning groove; when the first positioning portions are engaged with the second positioning portions, the positioning rib is located in the positioning groove.

6. The battery accommodating module of claim 4, wherein at least one of the first positioning portions has a protrusion; when the first positioning portions are engaged with the second positioning portions, the protrusion abuts against the second positioning portion correspondingly.

7. The battery accommodating module of claim 1, wherein the latch member has a support portion; when the latch member is located at the unlock position, the support portion abuts against a side wall of the battery case, such that the bottom of the latch member is raised with respect to the bottom of the battery case by a fixed angle.

8. The battery accommodating module of claim 1, wherein the battery has two arc-shaped edges, the battery case has a first arc-shaped clamping portion, and the latch member has a second arc-shaped clamping portion; when the battery is accommodated in the accommodating space, the first arc-shaped clamping portion and the second arc-shaped clamping portion clamp the two arc-shaped edges, respectively.

9. The battery accommodating module of claim 8, wherein the first arc-shaped clamping portion has a protruding block; when the battery is accommodated in the accommodating space, an interference fit is formed between the protruding block and one of the two arc-shaped edges.

10. The battery accommodating module of claim 1, wherein opposite sides of the battery case have a plurality of restraining ribs; when the battery is accommodated in the accommodating space, the restraining ribs abut against opposite sides of the battery.

\* \* \* \* \*